Feb. 28, 1956  E. H. BLADA  2,736,576
VEHICLE HITCH MEANS OF THE RESILIENT TYPE
Filed July 11, 1952  3 Sheets-Sheet 1
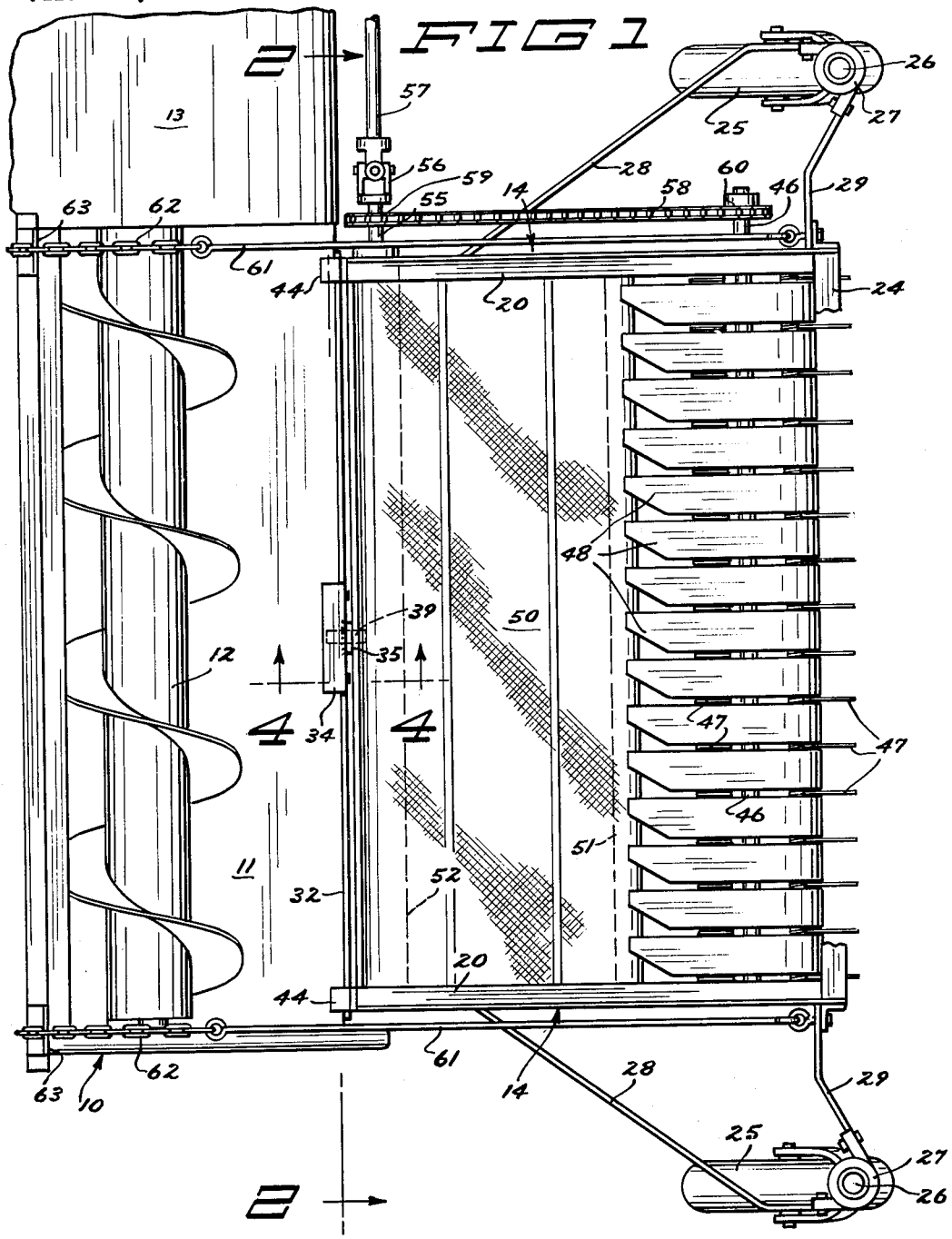
INVENTOR.
EDWARD H. BLADA
BY
Carlsen & Hayle
ATTORNEYS

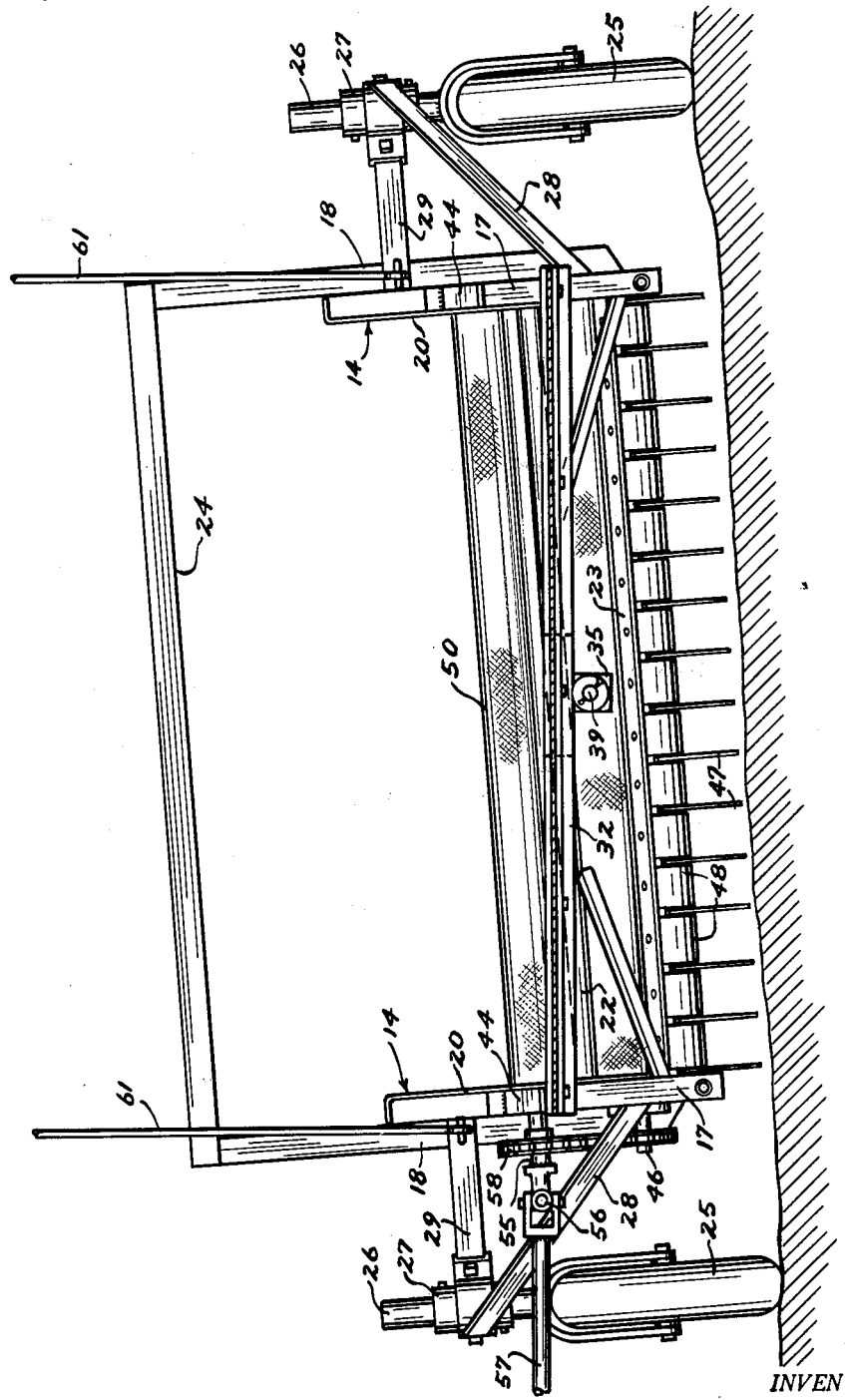

Feb. 28, 1956 E. H. BLADA 2,736,576
VEHICLE HITCH MEANS OF THE RESILIENT TYPE
Filed July 11, 1952 3 Sheets-Sheet 3
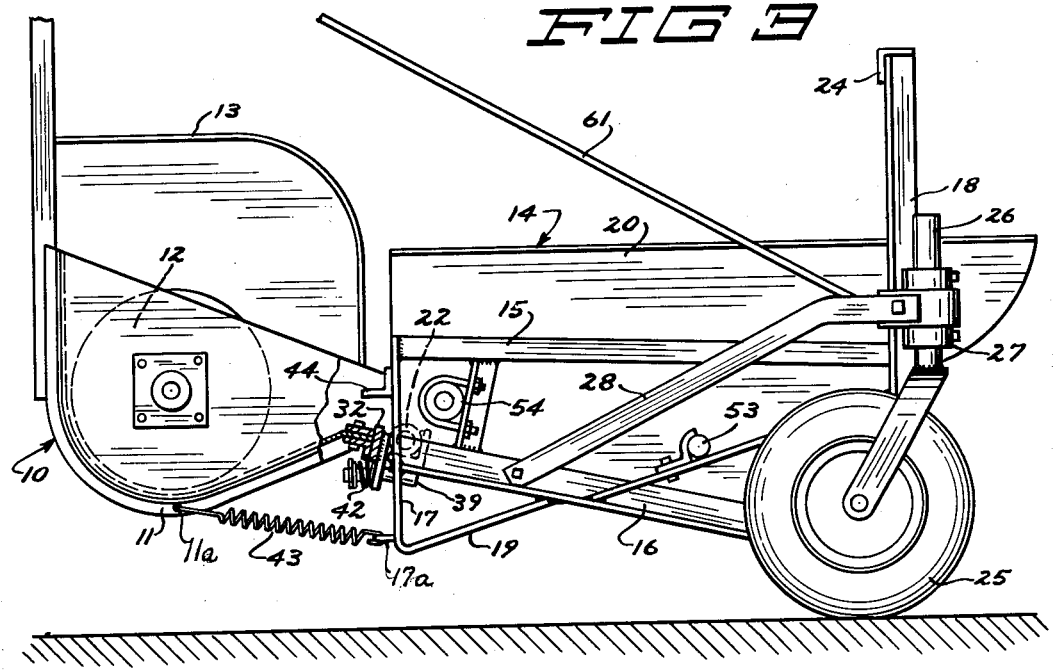
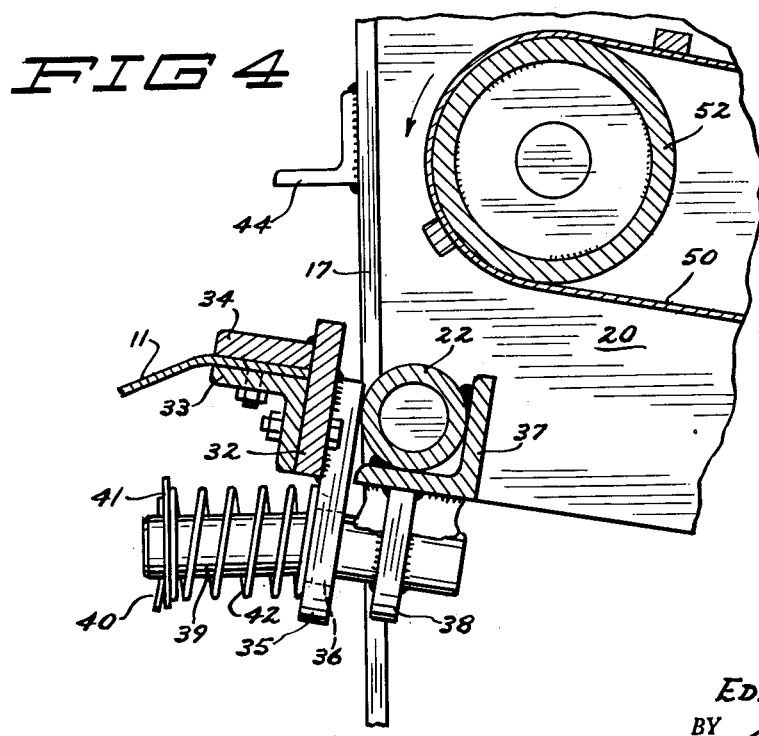
INVENTOR.
EDWARD H. BLADA
BY Carlsen & Hoyle
ATTORNEYS

United States Patent Office 2,736,576
Patented Feb. 28, 1956

2,736,576

VEHICLE HITCH MEANS OF THE RESILIENT TYPE

Edward H. Blada, Newburg, N. Dak.

Application July 11, 1952, Serial No. 298,399

1 Claim. (Cl. 280—483)

This invention relates generally to crop harvesting apparatus and more particularly to a pickup device for mounting on the platform of a combine to gather up and deliver to the platform cut grain laying broadcast or windrowed in the field.

It is frequently expedient in the harvesting of grain to cut the grain and leave it in the field for drying prior to subjecting it to the threshing operation. This is particularly true where the crop tends to ripen unevenly or where the crop is extremely weedy. Generally in such cases the crop is layed lightly on the field stubble in windows for the desired curing period. When the crop has cured to the desired stage, the combine machine may be moved through the field to gather up the straw and thresh the grain therefrom in the usual manner. The machine has a pickup mechanism, in place of the normal combine cutter bar, to gather the grain off the stubble on which it lays and deliver it to the combine platform from which it is conveyed to the threshing and separating section of the machine.

Heretofore the pickup devices have been either rigidly mounted on the platform or have been pivotally connected to allow floating action of the pickup about a transverse axis allowing the device to adapt itself to irregularities in the ground surface which are longitudinal with respect to the line of travel. However, it is also important that the pickup fingers have uniform intimacy with the ground regardless of ground irregularities transverse with respect to the line of travel. In other words, it is important that the pickup be allowed both fore and aft and side to side tilting action relative to the harvesting implement.

Accordingly, the primary object of the invention is to provide an improved mounting for a grain pickup device by which the device might readily adapt itself completely to irregularities in the ground surface as it moves thereover to insure an effective gathering position of the pickup fingers.

Another object of the invention is to provide an improved means for mounting a grain pickup device on a combine which allows the device floating movement about both longitudinal and transverse axes with respect to the line of travel of the combine.

Still another object of the invention is to provide a pickup which can be readily and simply attached to a combine platform.

With these and other objectives in mind, the present invention broadly comprises a rotary pickup attachment having independent ground support means at each side thereof and a means for pivotally connecting the rear end of the attachment to the leading edge of the crop receiving platform of a grain harvester, said means including a pivot pin allowing the attachment to automatically, laterally adjust when ground support means unequally encounter irregularities in the ground, and a second pivot means allowing fore and aft tilting adjustment when the support means equally encounter such irregularities, and spring means acting between the platform and attachment for biasing the attachment toward a level unadjusted position.

The above mentioned and additional objects of the invention will be brought to light during the course of the following specification, reference being made to the accompanying drawings, in which—

Fig. 1 is a plan view of the device shown mounted in operating position in front of a combine platform or header and with certain parts of the device broken away.

Fig. 2 is a transverse vertical section taken along line 2—2 of Fig. 1, and showing the device in laterally tilted position to conform with an irregularity in the ground surface.

Fig. 3 is a side elevation of the combine platform and pickup as shown in Fig. 1 and with certain parts broken away.

Fig. 4 is an enlarged detail section of the pickup pivot taken on line 4—4 of Fig. 1.

Referring now more particularly to the drawings, and using reference characters to denote like parts in the different figures, the harvester 10 is supported by suitable ground wheels (not shown) and the forward end thereof is provided with the usual transversely disposed grain receiving platform or header 11. A conveyor such as the auger 12 is mounted over the platform to carry crop deposited on the platform laterally into the housing 13 from which it is conveyed rearwardly to the harvester threshing mechanism.

The pickup device is attached along the leading edge of the platform to lift cut grain or the like off the field and deposit it upon the platform 11 for further handling as above described. The pickup frame broadly comprises a pair of opposing side sections 14 rigidly connected by cross members. Each section 14 has upper and lower longitudinally extending angle bars, denoted at 15 and and 16 respectively (Fig. 3), which are rigidly connected in vertically spaced relation by welding at their rear ends to a vertical bumper plate 17 and at their forward ends to an angle iron upright 18. Plate extends downwardly a short distance beyond the junction with member 16, as shown, and then angles forwardly as at 19 again meeting member 16 to form a rest for the rear end of the device when it is detached from the combine. Sheet metal shields 20 are provided on each side section to prevent accidental sideward escape of material handled by the device. The two side sections are connected in parallel position by a tubular cross member 22 which rigidly joins the rear ends of the members 17 and a cross member 23 (Fig. 2) extending between the forward portions thereof. The frame is further rigidified by a cross beam 24 connecting the top ends of the two uprights 18. There is thus provided a rigid horizontally rectangular frame structure for carrying the pickup mechanism.

Side wheels 25 are provided to support the front end of the device. Each wheel 25 is mounted on a tubular arm 26 held for castering on a vertical axis in a caster bearing 27. Bearings 27 are rigidly connected to the frame by bracket arms 28 and 29 extending to the adjacent side section. It will accordingly be understood that the wheel ground contacting surfaces are fixed relative to the attachment frame and that the frame will tilt with the plane between said surfaces as the wheels engage rises or depressions in the ground.

The means of attaching the pickup to the combine platform 11 will now be described. The leading edge of the platform is provided with a pushing bar 32 extending the entire length thereof and mounted by an angle iron 33 bolted to the underside of the platform (Fig. 4). A relatively short reinforcement plate 34 is welded to the bar to extend over the central portion of the platform edge. Welded to the front face at the center of bar 32 is the upper portion of a bearing bracket 35, the lower portion thereof having an opening 36 for reception of the pivot pin to be described.

At the longitudinal center of the tubular member 22 there is integrally secured by members 37 and 38 and various weld joints, a rearwardly extending pivot pin 39 adapted for insertion through the opening 36 in the bracket 35. The opening is sufficiently large to allow the pin oscillating action and longitudinal sliding movement therein.

As shown in Fig. 1, the pickup device has substantially the same width as the grain receiving portion of the platform. Accordingly, with the members 35 and 39 both centered respectively on these elements, when they are interlocked as in Fig. 4, the pickup device will extend across substantially the entire open portion of the platform. In hitching the device the pin is held against removal from the bracket 35 by cotter pin 40 with a washer 41 and coil spring 42 disposed around the pivot pin and between the cotter pin and bracket. The spring 42 tends to urge the device rearwardly so that the tube 22 bears against the plate 35. A pair of evenly balanced springs 43, only one of which is shown, each connect an eye 17a on member 17 to eye 11a mounted on the adjacent end of the underside of platform 11. A pair of stops 44 are mounted one on each of the members 17 at points spaced upwardly from the cross bar 22. These stops project rearwardly over the push bar 32.

The mechanism for picking the grain up off the ground and depositing it on the platform is of a conventional type. A rotatable shaft 46 extends transversely between opposing forward points on the side sections 14 being journaled in suitable bearings held therein. The shaft is provided at spaced points along its length with radially extending pickup fingers 47. These may be formed of short lengths of suitable spring wire coiled about the shaft with both ends extended to form two fingers. The coils are fixed to the shaft in a suitable manner so that the fingers will rotate therewith. I find it desirable to provide four rows of fingers. The usual stripper bands 48 are provided to separate the fingers in each row. These are secured to the cross member 23 curving forwardly and upwardly around the front of shaft 46 and then extending rearwardly to present a flat top strip deck. Accordingly, as shaft 46 is rotated the fingers will move upwardly, then rearwardly and down between the stripper bands to remove material from the fingers as they disappear downwardly.

Immediately to the rear of the pickup is mounted an apron conveyor to carry material from the stripper deck to the combine platform. This conveyor comprises an endless belt 50 which encircles front and rear rollers, denoted at 51 and 52 respectively, and which are journaled on the side frames as at 53 and 54 (Fig. 3). The front roller axis is slightly lower than that of the rear roller so that the conveyor inclines forwardly.

The shaft carrying roller 52 extends laterally beyond the frame as at 55 where it universally connects as at 56 with a drive shaft 57 leading from a tractor power take-off or other suitable power source. This power is also used to operate the finger shaft through drive chain 58 engaging sprockets 59 and 60 keyed respectively to the roller shaft and the finger shaft (Fig. 1).

It will now be understood that as the machine, with the pickup device attached, is moved through the field both the conveyor and pickup are driven in the same direction, that is a counterclockwise direction when viewing the device from the right side as in Figs. 3 and 4. The fingers project substantially beyond the strippers when they extend downwardly and, accordingly, as they move forwardly, upwardly and rearwardly about the axis 46 operate to scoop up the loose or windrowed grain and then withdraw as they deposit the grain on the conveyor belt 50, all in a well known manner. The conveyor then moving in the same rearward direction on its top side carries the grain back to the platform for engagement by the auger.

Attention is now recalled to the means of connecting the pickup to the platform in order that the more important aspects of my invention might be clearly understood. As heretofore mentioned it is of great advantage to allow the pickup to follow the contour of the ground to effectively gather up the grain where there are surface irregularities. To do so it is necessary that the device be allowed both fore and aft and side to side tilting movement relative to the combine.

In my construction it may be observed that the tubular cross bar is yieldably held against the member 35. There being no rigid connection between the device and the platform, when the wheels 25 simultaneously engage a rise in the ground the entire attachment rises with the wheels, tube 22 rocking upwardly along the member 35. Opening 36 is sufficiently larger than the pivot pin 39 to allow the pins forward partial withdrawal therefrom as the device rocks upwardly and it will be noted that the pin is bent slightly to facilitate this action. Springs 42 and 43 all tend to resist this upward tilting and accordingly prevent any bouncing of the device when irregularities are encountered at relatively high speeds.

Suspension rods 61 are provided to raise the device to and lock it in an inoperative position or to limit downward tilting of the device in operation. Each rod has one end pivoted to an upright 18 with a chain section 62 for connecting its other end to an elevated point on the harvester as at 63.

The pickup is allowed side to side tilting movement about the axis of pin 39. As shown in Fig. 2, when one wheel 29 engages a rise or depression in the ground the pickup will automaticaly tilt so that the fingers will maintain the proper crop gathering relation with the ground covered. The side to side tilting is limited by the stop members 44 mounted on the slide plates 17. As the attachment tilts in one direction the plate 17 on that side will slide downwardly along the platform edge bar 32 until the stop 44 on the plate meets the bar. As the device so tilts it will be obvious that the spring 43 on that side will be placed under increased tension and will accordingly operate to urge the device toward a laterally level position when smooth terrain is again encountered.

With the rear conveyor roller 52 lying substantially above the platform bottom the stops 44 are so located that even in its most tilted condition the entire rear unloading edge of the conveyor will move the material downwardly onto the platform.

It will be readily understood that the device may rock upwardly or downwardly and tilt sidewardly in simultaneous movement, therefore allowing automatic adjustment to any ground surface condition. Attachment of the device to the platform is simple and quick. I have therefore provided a construction which economically and effectively carries out the aforementioned objectives.

It is understood that suitable modifications may be made in the structure as disclosed, provided such modifications come within the spirit and scope of the appended claim. Having now therefore fully illustrated and described my invention, what I claim to be new and desire to protect by Letters Patent is:

Connecting means between a harvester device and a grain pickup device for travel in tandem relation over the ground, a bracket rigidly mounted on one device and presenting a generally vertical surface facing the other device, a tubular member rigidly mounted on the other device with the exterior thereof presenting a curved surface formed about a transverse axis and facing said one device, means for holding said tubular member surface in a line of contact with said vertical surface on the bracket for rolling movement of the tubular member along the vertical surface allowing relative adjustment between the two devices about a transverse axis, said means comprising a longitudinally extending pin on said other device below the tubular member, said bracket having an opening for receiving said pin for longitudinal sliding of the pin through said bracket with such rolling movement, and a spring means on the pin and acting against the bracket for yieldably preserving the line of contact between the bracket and tubular member.

References Cited in the file of this patent

UNITED STATES PATENTS

| | | |
|---|---|---|
| 1,212,949 | Hesse | Jan. 16, 1917 |
| 1,919,897 | MacGregor et al. | July 25, 1933 |
| 1,972,407 | Morse | Sept. 4, 1934 |
| 2,284,777 | Sund | June 2, 1942 |
| 2,318,229 | Jones | May 4, 1943 |
| 2,457,885 | Gatch | Jan. 4, 1949 |
| 2,513,966 | Pool et al. | July 4, 1950 |
| 2,517,413 | Pearson | Aug. 1, 1950 |